May 7, 1957  F. E. BACHMAN ET AL  2,791,294
ROTOR BRAKE
Filed Feb. 29, 1952  4 Sheets-Sheet 1

INVENTORS.
Fred E. Bachman
Gordon O. Buchholz
Mehmet Kemal Coskun

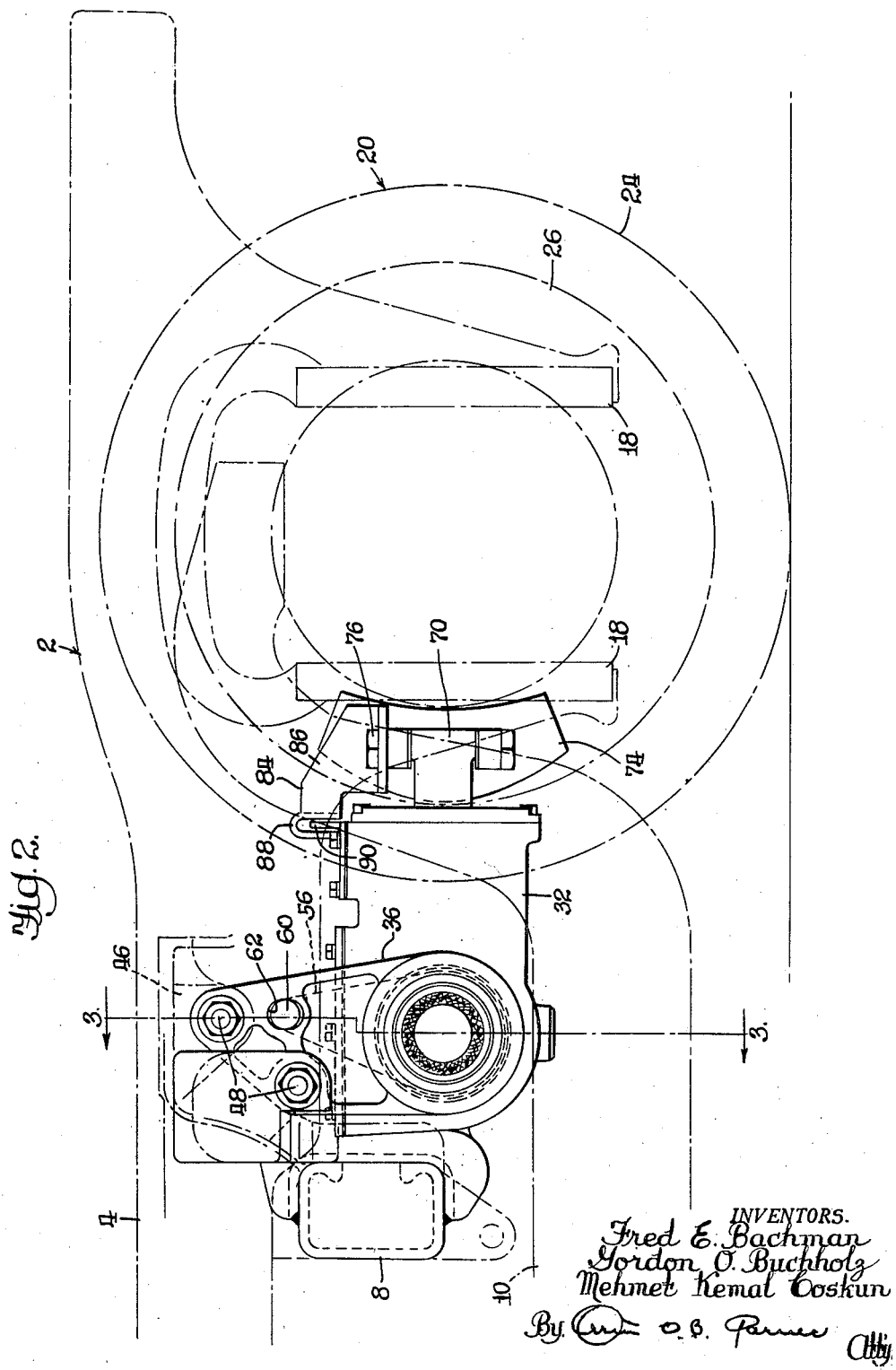

May 7, 1957 F. E. BACHMAN ET AL 2,791,294
ROTOR BRAKE
Filed Feb. 29, 1952 4 Sheets-Sheet 4

INVENTORS.
Fred E. Bachman
Gordon O. Buchholz
Mehmet Kemal Coskun

United States Patent Office 2,791,294
Patented May 7, 1957

2,791,294
ROTOR BRAKE

Fred E. Bachman, Granite City, Ill., Gordon O. Buchholz, St. Louis, Mo., and Mehmet Kemal Coskun, Granite City, Ill., assignors to American Steel Foundries, Chicago, Ill., a corporation of New Jersey Application February 29, 1952, Serial No. 274,196

6 Claims. (Cl. 188—59)

This invention relates to brake rigging for railway cars and is more particularly concerned with the provision of a disk type brake arrangement in which a disk or rotor secured to a wheel and axle assembly is frictionally engaged between a pair of stators or brake shoe forming part of and actuated by a brake mechanism supported upon a truck frame.

Briefly, the present invention contemplates the provision of a disk brake structure in which the brake shoe actuating mechanism is provided with spaced coaxial trunnions engaged in cylindrical resilient bushings mounted in support brackets bolted or otherwise secured to a truck frame transom. To engage the brake shoe actuating mechanism against rotational movement about the axis of the trunnions, a torque arm is secured at one of its ends to a trunnion and has its other end engaged in a slot provided in the adjacent support bracket, the slot being formed to permit vertical movement of the actuating mechanism and torque arm relative to the bracket responsive to engagement and disengagement of the brake shoes with the disk or rotor. By forming the bushings of resilient material such as rubber, the actuating mechanism is supported for limited axial movement relative to the truck frame responsive to axial movement of the wheel and axle assembly during application of the brake shoes to the opposite sides of the rotor.

In railway truck structures, the truck frame is commonly spring supported from an equalizer arrangement seated upon the journal ends of the wheel and axle assemblies and the truck frame is movable vertically relative to the wheel and axle assemblies. It will thus be understood that some provision must be made for maintaining the brake shoes in proper alignment with the rotor throughout movement of the truck frame relative to the wheel and axle assemblies. It is therefore another object of this invention to provide a brake arrangement in which the brake shoes at all times are maintained in proper braking position relative to the rotor.

This invention embodies other novel features, details of construction and arrangement of parts which are hereinafter set forth in the specification and claims and illustrated in the accompanying drawings, wherein:

Figure 2 is a side elevational view of same;

Figure 1:
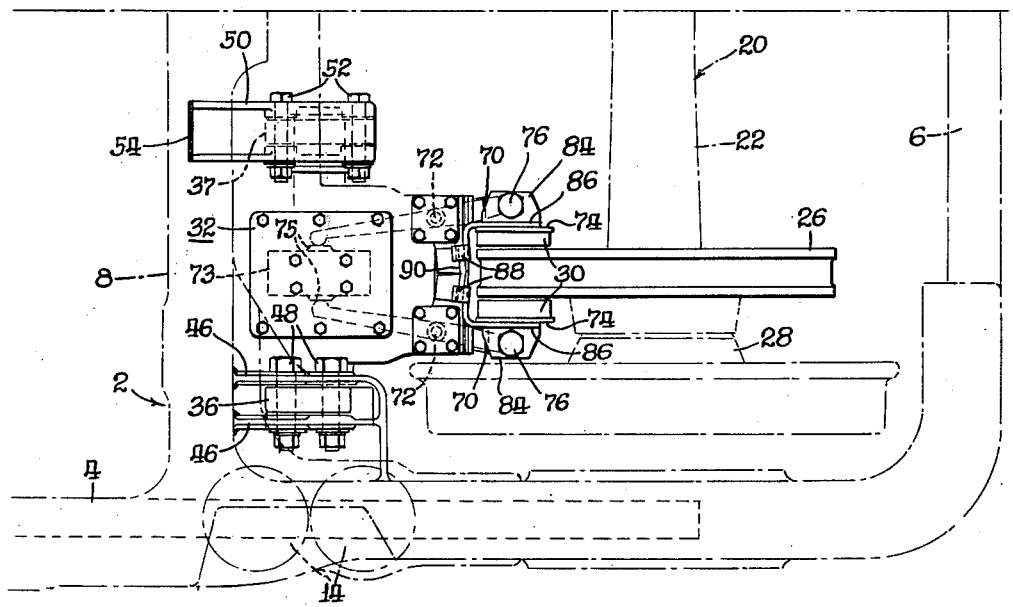
Figure 1 is a top plan view of a brake structure embodying features of the present invention, the structure being shown as applied at one corner of a conventional four wheel railway car truck.

Referring now to the drawings for a better understanding of this invention and more particularly to Figures 1 to 6 therein, the brake structure is shown as applied to a conventional four wheel railway car truck comprising a truck frame 2 having integral side rails 4—4, end rails 6—6, and spaced intermediate transoms 8—8 between which may be supported for lateral movement a bolster on which the car body may be mounted in the usual manner.

The truck frame 2 is resiliently supported upon equalizers 10—10 extending below the side rails and provided with spring seats 12 to engage the lower ends of compression springs 14, the upper ends of the springs being engaged against spring seats 16 provided on the underside of the side rails. The ends of the equalizers are mounted in conventional manner upon journal boxes (not shown) guided for vertical movement between pedestal legs 18—18 provided on the ends of the side rails, each pair of journal boxes engaging the journal ends of a wheel and axle assembly 20 embodying an axle 22 and a pair of wheels 24—24.

Figure 5:
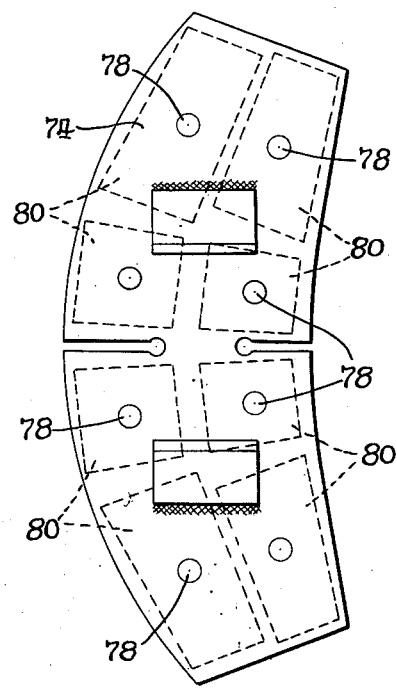
Figure 5 is a detail plan view showing a brake head and shoe assembly.

A disk or rotor 26 is bolted to the hub 28 of each wheel 24 for engagement between a pair of brake shoes 30—30 which, as illustrated in Figures 2 and 5, are preferably of crescent shape to insure that the entire friction face of each shoe shall be in position to frictionally engage the rotor when the latter moves vertically relative to the shoes during normal operation of the truck.

The brake structure is shown as comprising a housing 32 formed with coaxial trunnions 34—35 resiliently mounted in bearing brackets 36—37, respectively, by means of cylindrical resilient bushings 38—38a. Each bushing preferably comprises a tubular length of resilient material 40 such as natural or synthetic rubber bonded to and between an outer metal sleeve 42 and an inner metal sleeve 44. The upper end of the bracket 36 is disposed between and secured to a pair of spaced webs 46—46 by means of bolts 48, the webs being preferably formed integral with the truck frame 2. The upper end of the bearing bracket 37 is secured to a mounting bracket 50 by means of bolts 52, the mounting bracket being preferably welded at 54 to the adjacent transom 8.

A torque arm 56 is welded at 58 to the trunnion 34 and extends upwardly along the inboard side of the bearing bracket 36 for engagement therewith to prevent rotational movement of the housing 32 responsive to frictional engagement of the brake shoes 30—30 with the sides of the rotor 26. The upper end of the torque arm 56 is formed with a laterally projecting lug 60 which is disposed within a slot 62 formed in the bearing bracket, the slot having its long axis disposed vertically to permit limited relative vertical movement of the torque arm and bearing bracket.

It will be noted that the torque arm 56 engages the inboard edge of the inner metal sleeve 44 and that an annular flange 64 engages the outboard edge of the outer metallic sleeve 42 to thus engage the resilient bushing 38 against axial displacement. The resilient bushing 38a is secured against axial displacement from the trunnion 35 by means of an annular flange 66 formed on the inboard side of the bearing bracket 50 to engage the adjacent edge of the outer sleeve 42, and by means of a collar 68 welded on the trunnion 35 to engage the adjacent edge of the inner sleeve 44.

A pair of brake levers 70—70 are pivotally mounted intermediate their ends at 72 on the housing 32, the inner ends of the levers being engaged and moved apart by any suitable power means such as a double acting cartridge type cylinder 73 which may be of the type disclosed in the patent to Tack No. 2,355,122 in which fluid under pressure is introduced into the cylinder to actuate a pair of pistons 75—75. A brake head 74 is pivotally connected to the outer end of each lever 70 by means of a pivot pin 76 and is adapted to have a brake shoe 30 secured thereto by rivets 78.

Figure 6:
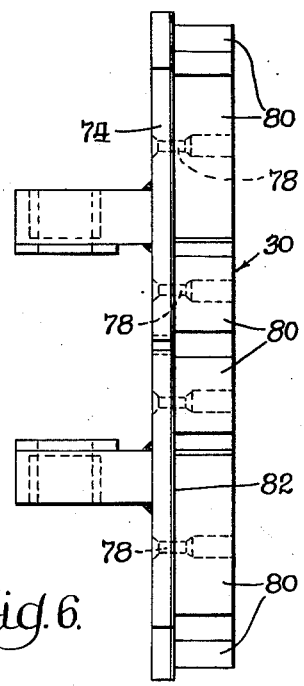
Figure 6 is a side elevational view of same.
Figure 3:
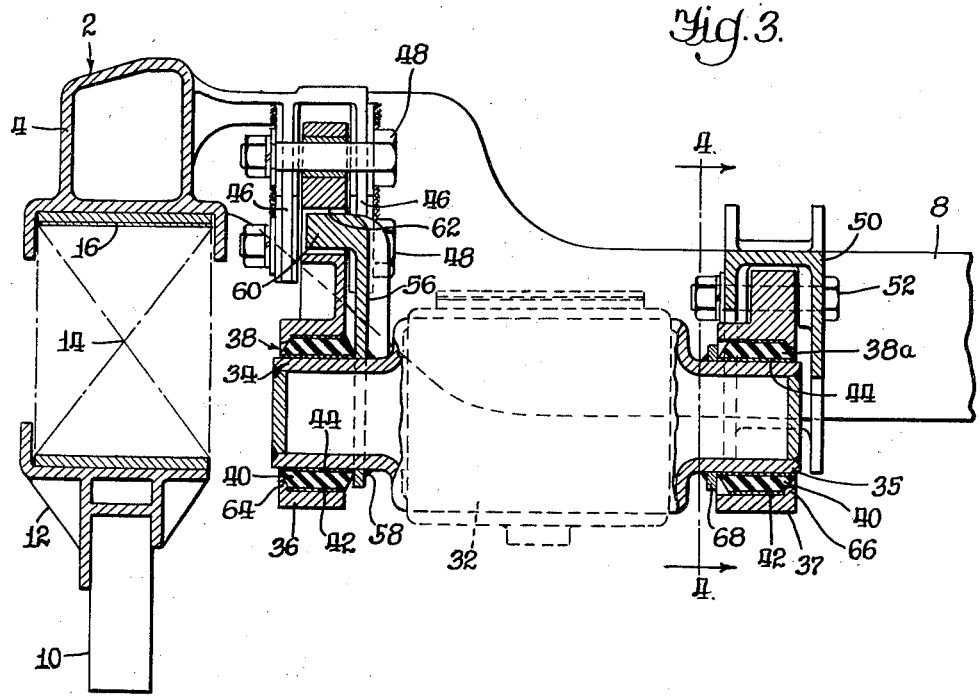
Figure 3 is a sectional view taken along the line 3—3 of Figure 2.
Figure 4:
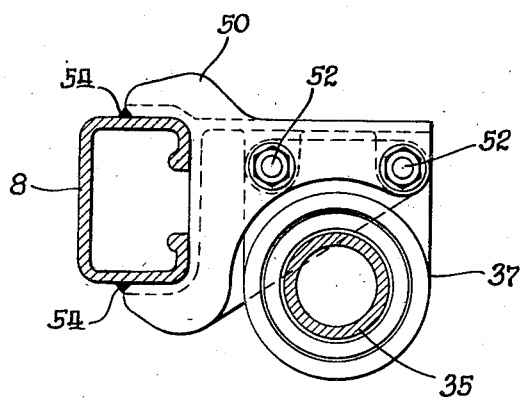
Figure 4 is a detail sectional view taken along the line 4—4 of Figure 3.

As illustrated in Figures 5 and 6 in the drawings, the brake shoe is shown as comprising a plurality of blocks of suitable friction material 80 bonded to a relatively thin sheet metal backing plate 82. The backing plate 82 and brake head 74 are of similar crescent shape with their outer arcuate edges having a radius of curvature smaller than the radius of the rotor 26, as illustrated in Figure 2, to maintain the entire friction face of the brake shoe in frictional engagement with the rotor during vertical movement of the rotor relative to the truck frame.

Each brake head is provided with a guide means to align the brake shoes with the friction faces on opposite sides of the rotor, said means comprising a guide plate 84 secured to each head by means of its associated pivot pin 76 and including a vertical web 86 in flush abutting engagement against the head. Each guide plate 84 is provided with an inverted V-shaped portion 88 to receive a guide tongue 90 secured on the housing 32. The brake head guide means is shown and described with greater particularity in a copending application filed February 17, 1951, Serial No. 211,515, in the name of William J. Casey, now Patent No. 2,690,237.

Figure 8:
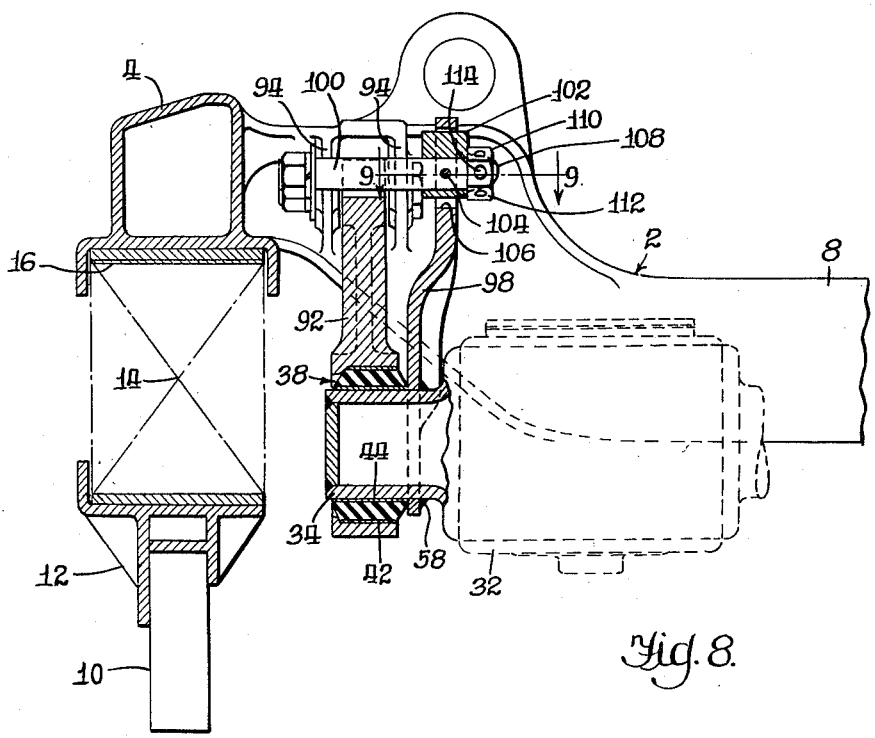
Figure 8 is a longitudinal sectional view taken along the line 8—8 of Figure 7.
Figure 7:
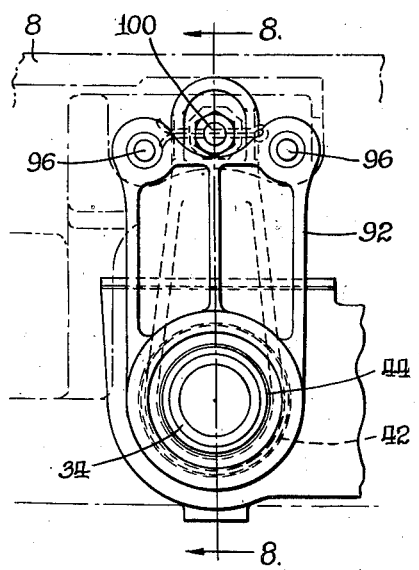
Figure 7 is an end elevational view illustrating a modified form of the invention.
Figure 9:
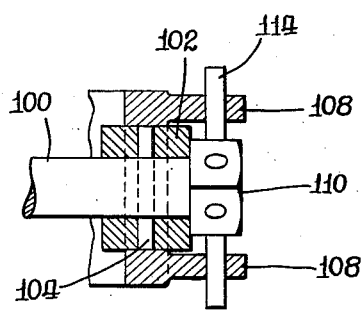
Figure 9 is a detail sectional view taken along the line 9—9 of Figure 8.

Figures 7, 8 and 9 illustrate a modified form of the invention in which the journal 34 of the housing 32 is resiliently mounted in the lower end of a bearing bracket 92 secured between a pair of spaced webs 94—94 on the transom 8 by means of bolts 96. A torque arm 98 is secured on the trunnion 34 and projects upwardly therefrom for engagement with an adjustment bolt 100 journaled in the webs 94—94. A cylindrical cam 102 is eccentrically mounted on the bolt 100 and secured against rotational movement relative thereto by means of a dowel or rivet 104, and the torque arm 98 is formed with a slot 106 to slidably receive the cam during vertical movement of the torque arm relative to the truck frame. By rotating the adjustment bolt 100, it will be noted that the brake shoes are raised or lowered, as desired, relative to the axis of the rotor. To lock the adjustment bolt 100 in fixed position, a pair of apertured ears 108—108 are formed on the torque arm to straddle the head 110 of the bolt, the head being formed with a plurality of angularly spaced openings 112 to receive a cotter pin 114 having its ends engaged in the apertured ears.

An off-wheel brake structure of the type thus shown and described is adapted to be resiliently supported on the transom of a railway car truck frame adjacent each wheel of the truck to decelerate a car, and it will be noted that the brake shoe actuating mechanism is formed as a complete unit adapted to be mounted on or removed from the frame without difficulty or the use of special tools.

By providing the brake structure with brake heads and shoes of crescent shape, it will be noted that the structure may be greatly simplified by providing a torque arm on the brake shoe actuating mechanism to engage one of the mounting brackets for relative vertical movement. During vertical movement of the wheel and axle assembly relative to the truck frame, it will be noted that the crescent-shaped brake shoes will be positioned at all times in full face engagement with the brake disk. In other types of rotor brake structures, it has been necessary to provide means to rotate the brake shoe actuating mechanism responsive to vertical movement of the wheel and axle assembly relative to the truck frame.

We claim:

1. In a railway car truck, a wheel and axle assembly, a truck frame spring supported therefrom, said frame comprising a transom member integrally formed therewith and extending transversely thereof adjacent and approximately parallel to said assembly, a brake disk secured to and rotatable with said assembly, spaced pairs of mounting webs integrally formed with the transom, an outboard bracket fixedly secured to the outboard pair of said mounting webs, said outboard bracket depending from said webs and presenting on the lower end thereof a cylindrical opening, an inboard bracket secured to the inboard pair of said webs and depending therefrom, said inboard bracket presenting at the lower end thereof a cylindrical opening axially aligned with said first mentioned cylindrical opening, a braking device comprising a housing interposed between said brackets, cylindrical trunnions on opposite sides of said housing extending into the openings in the inboard and outboard brackets respectively, resilient bushings positioned in said openings in the inboard and outward brackets and interposed between the related trunnion and the related bracket, each of said bushings being secured to the related bracket and the related trunnion, a torque arm fixedly secured to one of said trunnions, said torque arm extending upwardly from said one trunnion adjacent one of the brackets, and a pin and slot connection between said torque arm and the related one bracket, said connection being spaced from the related trunnion a greater distance than its spacing from the connection between the related bracket and related mounting webs, the slot of said pin and slot connection being elongated and having its long axis directed substantially vertically and its short axis directed substantially horizontally whereby vertical movement of said housing is limitedly accommodated and rotational movement of said housing on said trunnions is positively restrained.

2. In a railway car truck, a wheel and axle assembly, a truck frame flexibly supported therefrom, a transom forming part of the frame and extending generally transversely of the truck adjacent said assembly, and brake means operative to decelerate the truck, said brake means comprising a disk secured to and rotatable with said assembly, a movable shoe carrying brake package adjacent the disk, and means to support the package from the transom member, said last mentioned means comprising trunnions extending from opposite sides of the package, spaced bracket members connected to and depending from the transom and each having on the lower end thereof apertures respectively receiving the trunnions, resilient means interconnecting each trunnion and related bracket member, and a torque arm member secured to one of the trunnions and extending upwardly therefrom, and a connection between the torque arm and one of the bracket members at a point immediately adjacent the connection between said one bracket member and the related transom and substantially spaced from the connection between the torque arm and the related trunnion.

3. In a railway car truck, a wheel and axle assembly, a truck frame spring supported from the assembly and comprising a transom extending transversely of the frame adjacent the assembly, brake means to decelerate the truck comprising a disk rotatable with the assembly, a spring package positioned adjacent the disk and having movable friction shoes operative to engage opposite sides of the disk, means to support said package from the frame comprising coaxial trunnions extending from opposite sides of the package, spaced bracket members having apertures at the lower ends thereof receiving the trunnions respectively, said bracket members extending upwardly and having their upper ends secured to the transom, a torque arm member secured to one of said trunnions, said torque arm member extending generally upwardly from its related trunnion, and a pin and slot connection between one of the bracket members and the torque arm member, said connection being located immediately adjacent the point of connection between said one bracket and the transom and relatively substantially spaced from the point of connection between the torque arm member and the related trunnion, said pin and slot connection comprising a slot in one of the members and a pin secured to the other of said members, said slot having its long axis extending vertically, whereby relatively substantial movement of the brake package in a vertical direction is accommodated, said slot having its short axis extending substantially horizontally whereby rotational movement of the brake package on its trunnions is positively restrained.

4. In a railway car truck according to claim 3, wherein said slot is located on the related bracket member.

5. In a railway car truck, a wheel and axle assembly, a truck frame resiliently supported from the assembly and including a transom member extending transversely of the truck adjacent said assembly, and brake means operative to decelerate the truck, said brake means comprising rotatable friction surfaces on said assembly, friction means engageable with said surfaces, a movable brake package carrying said friction means and positioned adjacent said friction surfaces, and means to support the package from the transom member, said last mentioned means including trunnions extending from opposite sides of the package, a pair of spaced bracket members connected to and depending from the transom member and having adjacent their lower ends apertures receiving the respective trunnions, resilient means interconnecting each trunnion and related bracket member, a torque arm disposed adjacent one of said bracket members rigidly secured to one of the trunnions and extending upwardly therefrom, and a connection between the torque arm and said one bracket member at a point immediately adjacent the connection between said one bracket member and the transom member and substantially spaced from the connection between the torque arm and the related trunnion.

6. A railway car truck according to claim 5, wherein the connection between the torque arm and said one bracket member comprises a pin and slot connection accommodating movement of the brake package in a vertical direction and operable to restrain rotational movement of the brake package on its trunnions.

References Cited in the file of this patent
UNITED STATES PATENTS

| | | |
|---|---|---|
| 1,794,348 | Chase | Feb. 24, 1931 |
| 2,343,342 | Tack | Mar. 7, 1944 |
| 2,355,120 | Tack | Aug. 8, 1944 |
| 2,357,619 | Tack | Sept. 5, 1944 |
| 2,377,190 | Tack | May 29, 1945 |
| 2,423,694 | Eksergian et al. | July 8, 1947 |
| 2,431,774 | Schumacher | Dec. 2, 1947 |
| 2,655,226 | Tack et al. | Oct. 13, 1953 |